(12) United States Patent
Nagasoe et al.

(10) Patent No.: US 7,447,858 B2
(45) Date of Patent: **\*Nov. 4, 2008**

(54) STORAGE SYSTEM WHICH CONTROLS ACCESS TO LOGICAL DEVICES BY PERMITTING ATTRIBUTE MODES FOR THE LOGICAL DEVICES TO BE SET

(75) Inventors: Yasuyuki Nagasoe, Odawara (JP); Hisao Homma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 75 days.

This patent is subject to a terminal disclaimer.

(21) Appl. No.: 11/508,873

(22) Filed: Aug. 24, 2006

(65) Prior Publication Data

US 2006/0282617 A1 Dec. 14, 2006

Related U.S. Application Data

(63) Continuation of application No. 10/769,887, filed on Feb. 3, 2004, now Pat. No. 7,124,265.

(30) Foreign Application Priority Data

Jun. 27, 2003 (JP) ............................. 2003-184598

(51) Int. Cl.
*G06F 12/00* (2006.01)
(52) U.S. Cl. .................................................. 711/163
(58) Field of Classification Search ................ 711/163
See application file for complete search history.

(56) References Cited

U.S. PATENT DOCUMENTS

| | | | |
|---|---|---|---|
| 5,758,125 A | 5/1998 | Misinai et al. ................. 703/23 |
| 5,926,833 A | 7/1999 | Rasoulian et al. ........... 711/147 |
| 6,237,008 B1 | 5/2001 | Beal et al. | |
| 6,272,537 B1 | 8/2001 | Kekic et al. | |
| 6,272,662 B1 | 8/2001 | Jadav et al. | |
| 6,493,825 B1 | 12/2002 | Blumenau et al. ........... 713/168 |
| 6,606,695 B2 | 8/2003 | Kamano et al. ............. 711/163 |
| 6,718,372 B1 | 4/2004 | Bober ......................... 709/217 |
| 6,912,627 B2 | 6/2005 | Matsunami et al. ......... 711/154 |

(Continued)

FOREIGN PATENT DOCUMENTS

DE 19882723 9/2000

(Continued)

*Primary Examiner*—Sanjiv Shah
*Assistant Examiner*—Jesse Diller
(74) *Attorney, Agent, or Firm*—Mattingly, Stanger, Malur & Brundidge, P.C.

(57) ABSTRACT

There is provided a storage system suitable for an open system which has advanced security functions for logical devices. In a storage system such as a RAID system, 6 types of access attributes which are Readable/Writable, Read Only, Unreadable/Unwritable, Read Capacity 0, Inquiry Restricted, and S-vol Disable, can be set for each logical device. Read Capacity 0 makes a response "capacity 0" upon inquiries from hosts about capacity. Inquiry Restricted does not permit the hosts to recognize logical devices. S-vol Disable does not permit pair forming for duplication of a logical device with another device as the destination of copying. Upon receipt of commands from hosts of the open system, the storage system changes command processes and responses, depending on the difference in operation system, vendor, version, or the like, between hosts.

10 Claims, 18 Drawing Sheets

| OPERATION<br>ATTRIBUTE MODE | READ | WRITE | INQUIRY | READ CAP | S-VOL DESIGNATION |
|---|---|---|---|---|---|
| (1) READABLE/WRITABLE | O | O | O | ACTUAL CAPACITY | O |
| (2) READ ONLY | O | × | O | ACTUAL CAPACITY | O |
| (3) UNREADABLE/UNWRITABLE | × | × | O | ACTUAL CAPACITY | O |
| (4) READ CAPACITY 0 | × | × | O | "0" | O |
| (5) INQUIRY RESTRICTED | × | × | × | × | O |
| (6) S-VOL DISABLE | O | O | O | ACTUAL CAPACITY | × |

U.S. PATENT DOCUMENTS

| | | |
|---|---|---|
| 2001/0037357 A1 | 11/2001 | Anzai et al. |
| 2001/0047463 A1 | 11/2001 | Kamano et al. ............. 711/163 |
| 2002/0103913 A1 | 8/2002 | Tawil et al. ................. 709/229 |
| 2002/0169928 A1 | 11/2002 | Kimura et al. |
| 2003/0093501 A1 | 5/2003 | Carlson et al. |
| 2003/0097504 A1 | 5/2003 | Oeda et al. |
| 2003/0182501 A1 | 9/2003 | George et al. ............... 711/114 |
| 2003/0225993 A1 | 12/2003 | Yagisawa et al. |
| 2004/0064604 A1 | 4/2004 | Cox ........................... 710/36 |
| 2004/0153616 A1 | 8/2004 | Nakamura et al. .......... 711/162 |
| 2004/0199736 A1 | 10/2004 | Kamano et al. ............. 711/163 |
| 2004/0268038 A1 | 12/2004 | Nagasoe et al. ............. 711/114 |
| 2005/0033914 A1 | 2/2005 | Matsunami et al. ......... 711/114 |
| 2005/0120175 A1 | 6/2005 | Shimada et al. ............. 711/114 |
| 2005/0160275 A1 | 7/2005 | Mitsuoka et al. ............ 713/182 |

FOREIGN PATENT DOCUMENTS

| | | |
|---|---|---|
| EP | 1150291 | 10/2001 |
| EP | 1158386 | 11/2001 |
| GB | 2270791 | 3/1994 |
| JP | 2000112822 | 4/2000 |
| JP | 2000267908 | 9/2000 |
| JP | 2002149650 | 5/2002 |
| WO | 9918507 | 5/1999 |

RETURN "0" TO READ CAPACITY COMMAND

FIG. 4

| ATTRIBUTE MODE \ OPERATION | READ | WRITE | INQUIRY | READ CAP | S-VOL DESIGNATION |
|---|---|---|---|---|---|
| (1) READABLE/WRITABLE | ○ | ○ | ○ | ACTUAL CAPACITY | ○ |
| (2) READ ONLY | ○ | × | ○ | ACTUAL CAPACITY | ○ |
| (3) UNREADABLE/UNWRITABLE | × | × | ○ | ACTUAL CAPACITY | ○ |
| (4) READ CAPACITY 0 | × | × | ○ | "0" | ○ |
| (5) INQUIRY RESTRICTED | × | × | × | × | ○ |
| (6) S-VOL DISABLE | ○ | ○ | ○ | ACTUAL CAPACITY | × |

FIG. 6

| ACCESS ATTRIBUTE MODE | ACCESS ATTRIBUTE CONTROL INFORMATION | | | | |
|---|---|---|---|---|---|
| | READ RESTRICTION BIT | WRITE RESTRICTION BIT | INQUIRY RESTRICTION BIT | READ CAP 0 REPORT BIT | S-VOL DISABLE BIT |
| (1) READABLE/WRITABLE | 0 | 0 | 0 | 0 | 0 |
| (2) READ ONLY | 0 | 1 | 0 | 0 | 0 |
| (3) UNREADABLE/UNWRITABLE | 1 | 1 | 0 | 0 | 0 |
| (4) READ CAPACITY 0 | 1 | 1 | 0 | 1 | 0 |
| (5) INQUIRY RESTRICTED | 1 | 0 | 1 | 1 | 0 |
| (6) S-VOL DISABLE | 0 | 0 | 0 | 0 | 1 |
| (7) CANCEL | 0 | 0 | 0 | 0 | 0 |

FIG. 10

| HOST MODE | OTHER INFORMATION OF EACH HOST GROUP | |
|---|---|---|
| HOST GROUP 00 | 03 | |
| HOST GROUP 01 | 07 | |
| HOST GROUP 02 | 04 | |
| ... | | |
| HOST GROUP (m-1) | | |

FIG. 12

COMMAND PROCESS LIST

| COMMAND CODE | | | |
|---|---|---|---|
| 00 | PROCESS A | PROCESS C | PROCESS E |
| 01 | PROCESS B | PROCESS C | PROCESS F |
| 02 | PROCESS B | PROCESS D | |
| ⋮ | | | |
| k-1 | | | |

FIG. 14

MODE DEPENDENT PROCESS LIST

| | HOST MODE 00 | HOST MODE 01 | HOST MODE 02 | ... | HOST MODE j-1 |
|---|---|---|---|---|---|
| SUBPROCESS 1 | SUBPROCESS a | SUBPROCESS a | SUBPROCESS b | | |
| SUBPROCESS 2 | SUBPROCESS c | SUBPROCESS c | SUBPROCESS c | | |
| SUBPROCESS 3 | SUBPROCESS d | SUBPROCESS e | SUBPROCESS d | | |
| ... | | | | | |
| SUBPROCESS i-1 | | | | | |

FIG. 15

MODE DEPENDENT ERROR LIST

| ERROR CODE | HOST MODE 00 | HOST MODE 01 | HOST MODE 02 | ... | HOST MODE j-1 |
|---|---|---|---|---|---|
| ERROR 1 | 02 | 05 | 04 | | |
| ERROR 2 | 01 | 01 | 03 | | |
| ERROR 3 | 01 | 00 | 00 | | |
| ... | | | | | |
| ERROR p-1 | | | | | |

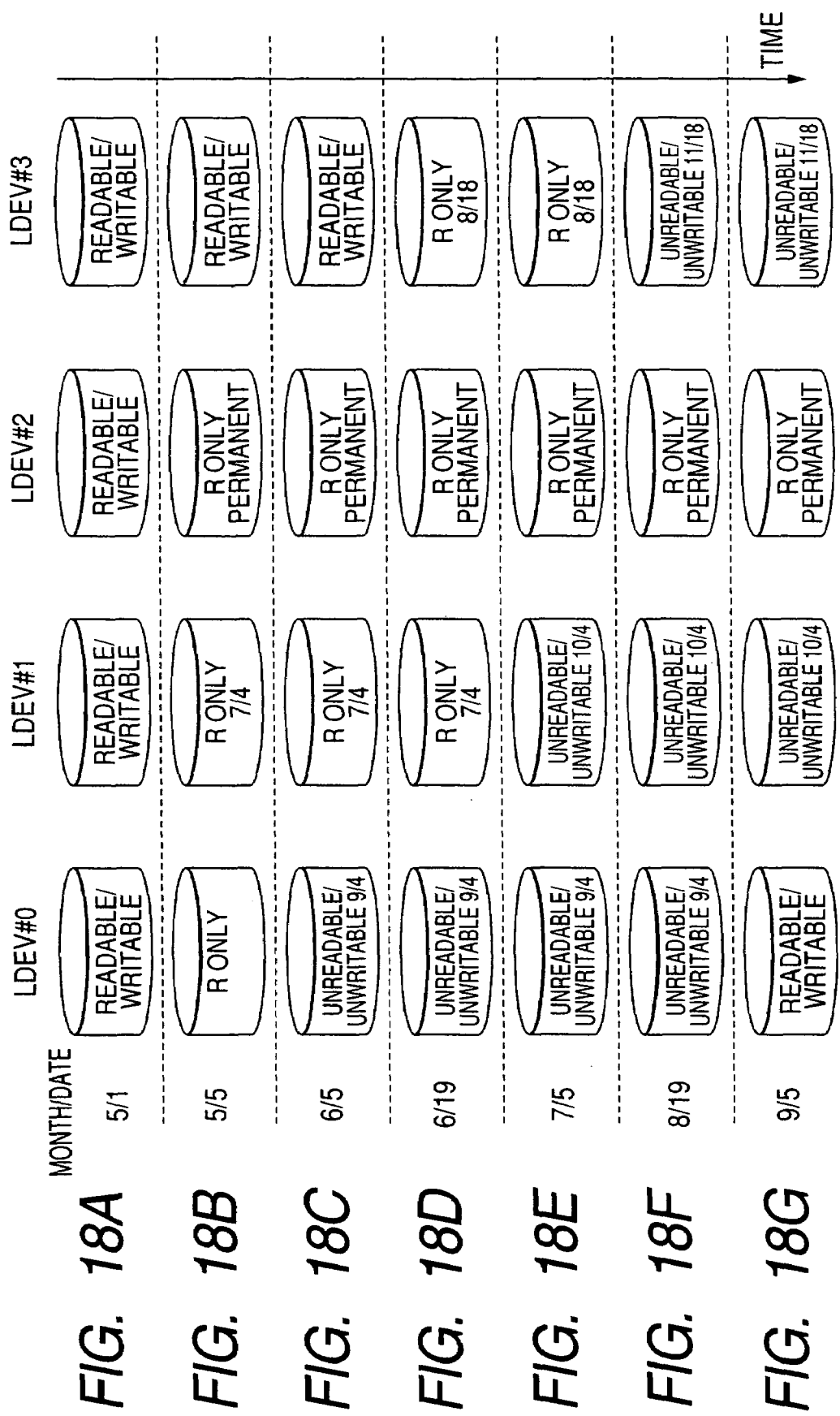

STORAGE SYSTEM WHICH CONTROLS ACCESS TO LOGICAL DEVICES BY PERMITTING ATTRIBUTE MODES FOR THE LOGICAL DEVICES TO BE SET

CROSS-REFERENCE TO RELATED APPLICATIONS

The present application is a continuation of application Ser. No. 10/769,887, filed Feb. 3, 2004, now U.S. Pat. No. 7,124,265; which claims priority from Japanese Patent Application No. 2003-184598, filed on Jun. 27, 2003, the entire disclosure of which is incorporated herein by reference.

BACKGROUND OF THE INVENTION

1. Field of the Invention

The present invention relates to a storage system which is represented by a RAID system, for example, and particularly relates to a technology for is control of access from a host to logical devices (logical units in a storage unit) in the storage system and security functions for the logical devices.

2. Description of the Related Art

As an art related to control of access from a host to logical devices in a RAID system and security functions for the logical devices, there is a disk control method disclosed in Japanese Patent Laid-Open No. 2000-112822, for example. This method sets any one of three types of access attribute modes of 'readable and writable', 'unreadable', and 'unreadable and unwritable' for respective logical devices in the RAID system, and changes processes and responses to commands from hosts for the respective logical devices, according to the setting.

Due to the development and complication of operations of storage systems represented by RAID systems, three types of access attribute modes disclosed in Japanese Patent Laid-Open No. 2000-112822 is not sufficient, and a new security control method for logical devices is required. For example, when operation that forms a copy pair between two logical devices for duplication of a logical device is performed in a storage system, a function which can prevent data losing due to an error in the operation is required.

Also, in a case that the range of applying this type of storage system is broadened from proprietary systems (computer systems configured only by products of specific vendors) to open systems (computer systems configured by a combination of software and hardware of various vendors), it is required that access control which is performed on hosts of specific vendors can also be performed on hosts of various types or specifications of different vendors, operation systems, or versions. For example, operations of a case that the storage system returns errors to hosts differ depending on the differences between the types of hosts or specifications (such as vendors, operation systems, or versions). Therefore, selection of a method of returning errors suitable for the types of hosts is important. In addition, there is a case that requires changing of operations or responses of a storage system to hosts, according to the types of the hosts.

Further, for reduction in cost, there is also a requirement that management tasks such as setting, canceling, and the like, of access attribute modes of respective logical devices of a storage system can be automatically performed from applications on various hosts of an open system.

SUMMARY OF THE INVENTION

Accordingly, it is an object of the present invention to provide an advanced method of access control or security control of logical devices of a storage system.

It is another object of the invention to make the operations and responses of logical devices of a storage system to hosts suitable for an open system.

It is still another object of the invention to make it possible to automatically perform management tasks such as setting, canceling, and the like, of access attribute modes of respective logical devices of a storage system from applications on various hosts of an open system.

Other objects of the invention will be specifically apparent in the description of an embodiment described later.

In a first aspect of the invention, a storage system which can communicate with one or more outer unit comprises a plurality of logical devices; access attribute mode setting means that sets one or more access attribute mode for each logical device, the access attribute mode being selected from a plurality of predetermined access attribute modes; and access control means that controls a requested access operation, according to an access attribute mode which is set for the designate logical device, when a command requesting the access operation on a logical device which is designated from the outer unit is input, and outputs a response having information on a result of the controlled access operation to the outer unit. One or more device recognition control mode for applying predetermined restriction to a device recognition type operation by which the outer unit recognizes a logical device itself or the capacity thereof is included in the predetermined access attribute mode. The access control means comprises device recognition control means for outputting, in the case that the access attribute mode which is set for the designated logical device is the device recognition control mode and the access operation requested from the outer unit is the device recognition type operation on the designated logical device, a response having information on a result of adding the predetermined restriction which accords to the set device recognition control mode to the requested device recognition type operation, the result being output to the outer unit.

In a second aspect of the invention, one of the device recognition restriction modes is of zero reading capacity. In the case that the access attribute mode which is set for the designated logical device is said zero reading capacity and the access operation requested by the outer unit is to recognize the capacity of the designated logical device, the device recognition control means of the access control means outputs a response having information which indicates that the capacity of the designated logical device is zero.

In a third aspect of the invention, one of the device recognition restriction modes is restriction of inquiries. In the case that the access attribute mode which is set for the designated logical device is the restriction of inquiries and the access operation requested by the outer unit is to recognize the designated logical device itself, the device recognition control means of the access control means outputs a response having information which indicates the result of restriction of recognition of the designated logical device, to the outer unit.

In a fourth aspect of the invention, in the case that the access attribute mode which is set for the designated logical device is the device recognition control mode, and the access operation requested by the outer unit is to read or write data from/to the designated logical device, the device recognition control means of the access control means outputs a response having information which indicates the result of restriction of reading or writing data from/to the designated logical device, to the outer unit.

In a fifth aspect of the invention, a storage system which can communicate with one or more outer unit comprises a plurality of logical devices; access attribute mode setting means that sets one or more access attribute mode for each logical device, the access attribute modes being selected from a plurality of predetermined access attribute modes; and access control means that controls a requested access operation, according to an access attribute mode which is set for the designated logical device, when a command requesting the access operation on a logical device which is designated by the outer unit is input, and outputs a response having information on the result of the controlled access operation to the outer unit. One or more copy pair forming control mode for applying predetermined restriction to a copy pair forming operation for forming a copy pair with another logical device, having the designated logical device as a secondary volume, is included in the predetermined access attribute mode. The access control means comprises copy pair forming control means for outputting, in the case that the access attribute mode which is set for the designated logical device is the copy pair forming control mode and the access operation requested from the outer unit is the copy pair forming operation on the designated logical device, a response having information on a result of adding the predetermined restriction which accords to the set copy pair forming control mode to the requested copy pair forming operation, the result being output to the outer unit.

In a sixth aspect of the invention, the predetermined access attribute mode further includes one or more data manipulation control mode for controlling data manipulation type operation for reading or writing data from/to the designated logical device, and/or one or more device recognition control mode for controlling device recognition type operation for recognizing the designated logical device itself or the capacity thereof. The access attribute mode setting means can set both the data manipulation control mode and the copy pair forming control mode in duplicate, or both the device recognition control mode and the copy pair forming control mode in duplicate, on the same logical device.

In a seventh aspect of the invention, a storage system which can communicate with a plurality of outer units of different types comprises: unit mode setting means that selects a single unit mode corresponding to a unit type of each of the outer units from a plurality of predetermined unit modes and sets the selected unit mode for each of the outer units; a mode dependent operation storage unit that stores a type of operation to be performed when a command of a predetermined type is processed, for each unit mode; mode dependent response storage means that stores a type of information to be included in a response to the processed command in the case that a result of processing the command is a result of a predetermined type, for each unit mode; command processing means, the command processing means being for processing a command which is input from one of the outer units, which, in the case that the command which has been input is a command of the predetermined type, selects an operation type in processing the command which has been input, the operation type being correspondent to a unit mode which is set for the outer unit which has issued the command and being selected from operation types for respective unit modes stored in the mode dependent operation storage means, and performs an operation corresponding to the selected type of operation; and command responding means that outputs a response including information corresponding to the result of processing by the command processing means to the outer unit which has issued the command, and in the case that the result of the processing is the result of the predetermined type, selects an information type corresponding to the unit mode which is set for the outer unit which has issued the command, the information type being selected from information types for the respective unit modes stored in the mode dependent response storage means, and outputs a response including information corresponding to the selected information type to the outer unit which has issued the command.

In an eighth aspect of the invention, in a computer system comprising a plurality of outer units of different types and a storage system which can communicate with the outer units, each of the plurality of outer units is installed with an application program which uses the storage system, and a storage management program for performing management control associated with setting and controlling security functions for logical devices of the storage system, according to an instruction from the application program. Each of the plurality of outer units automatically performs the management control of the storage system from the application program through the storage management program.

BRIEF DESCRIPTION OF THE DRAWINGS

FIG. 4 is a diagram indicating contents of operation control of the logical devices for which 6 types of access attribute modes are respectively set;

FIG. 6 is a diagram showing corresponding relationships between the 6 types of access attribute modes shown in FIGS. 3 and 4 and the bit patterns of the access attribute modes shown in FIG. 5;

FIG. 10 is a diagram showing an example of a host group information table;

FIG. 12 is a diagram showing an example of a command process list;

FIG. 14 is a diagram showing an example of a mode dependent process list;

FIG. 15 is a diagram showing an example of a mode dependent error list;

FIG. 18 is a diagram explaining a method of controlling disclosure/nondisclosure of archival data to the internet or the like, as another application example of the HDD subsystem 10.

DESCRIPTION OF A PREFERRED EMBODIMENT

An embodiment will be described below with reference to the accompanying drawings.

Figure 1:
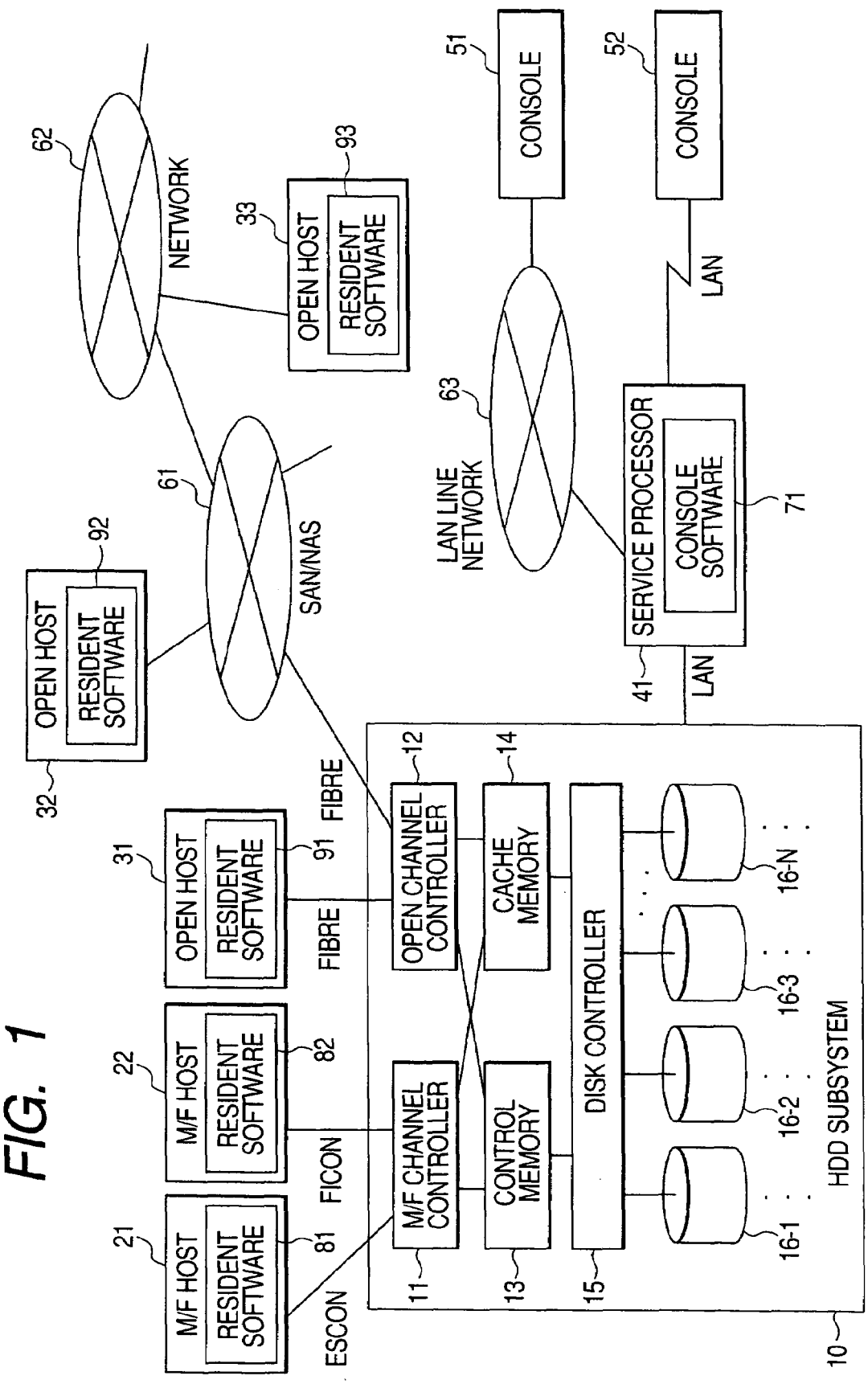
FIG. 1 is a block diagram showing a system configuration of a computer system to which a storage system according to an embodiment of the invention is applied.

FIG. 1 shows an example of a system configuration of a computer system to which a storage system according to an embodiment of the invention is applied;

As shown in FIG. 1, a hard disk (HDD) subsystem (RAID system) 10 which is an embodiment of the invention comprises a plurality of channel controllers 11 and 12 for control of communication with various hosts. The main frame (M/F) channel controller 11 is a channel controller for a proprietary system, and connected with one or more mainframe (M/Fs) hosts 21 and 22 which have specific operation systems and are from specific vendors through interfaces for M/Fs such as ESCON or FISCON, for example. The open channel controller 12 is a channel controller for an open system, and connected with various hosts (open hosts) 31, 32, and 33 having specifications different in operation systems configuring the open system, vendors, or the like, through interfaces such as FIBRE and through a dedicated line or networks 61 and 62 such as SAN.

This HDD subsystem 10 provides the hosts 21, 22, and 31 to 33 which are connected to the channel controllers 11 and 12 with one or a plurality of logical devices (logical units of a storage unit).

In the HDD subsystem 10, in addition to the channel controllers 11 and 12, there are provided with a control memory 13, a cache memory 14, a disk controller 15, a plurality of HDD units 16-1 to 16-N which are physical devices, and the like. The disk controller 15 controls reading/writing operation of data from/to the HDD units 16-1 to 16-N. The control memory 13 and the cache memory 14 are accessed from both the channel controllers 11 and 12, and the disk controller 15. The control memory 13 is used for storing various control information which is necessary for access control of the respective logical devices and control of other operations. The cache memory 14 is used for temporarily keeping data to be the object of reading/writing.

Also, this HDD subsystem 10 is connected with a service processor 41 through, for example, a LAN (an internal LAN which is connected with the channel controllers 11 and 12, the disk controller 15, and the like in the HDD subsystem 10, and is for operation control of the HDD subsystem 10). The service processor 41 is installed with console software program 71 having functions to perform control of management of setting of access attribute modes and setting of other functions for respective logical devices of the HDD subsystem 10. The service processor 41 is further connected with one or more consol terminals 51 and 52 through, for example, a LAN or another network 63. The console software program 71 of the service processor 41 functions as a web server for the console terminals 51 and 52, and thereby performs control of the management of the HDD subsystem 10 in response to requests from the respective consol terminals 51 and 52.

Further, the M/F hosts 21 and 22 are installed with storage management software programs 81 and 82 which are resident software programs and suitable for the operation systems of the M/F hosts 21 and 22. The open hosts 31 to 33 are also installed with storage management software programs 91 to 93 which are resident software programs and suitable for the respective different operation systems of the open hosts 31 to 33. Each of the storage software programs 81, 82, and 91 to 93 has a function to perform control of storage management of setting of access attribute modes, and setting and control of other functions and operations for the respective logical devices of the HDD subsystem 10 in response to instructions from application programs (not shown) to use the HDD subsystem 10, wherein the application programs are installed on the respective hosts. Therefore, the respective M/F hosts 21 and 22 and open hosts 31 to 33 can automatically perform various control of management for the HDD subsystem 10 from the application programs (not shown) installed thereon through the storage management software programs 81, 82, and 91 to 93.

Figure 2:
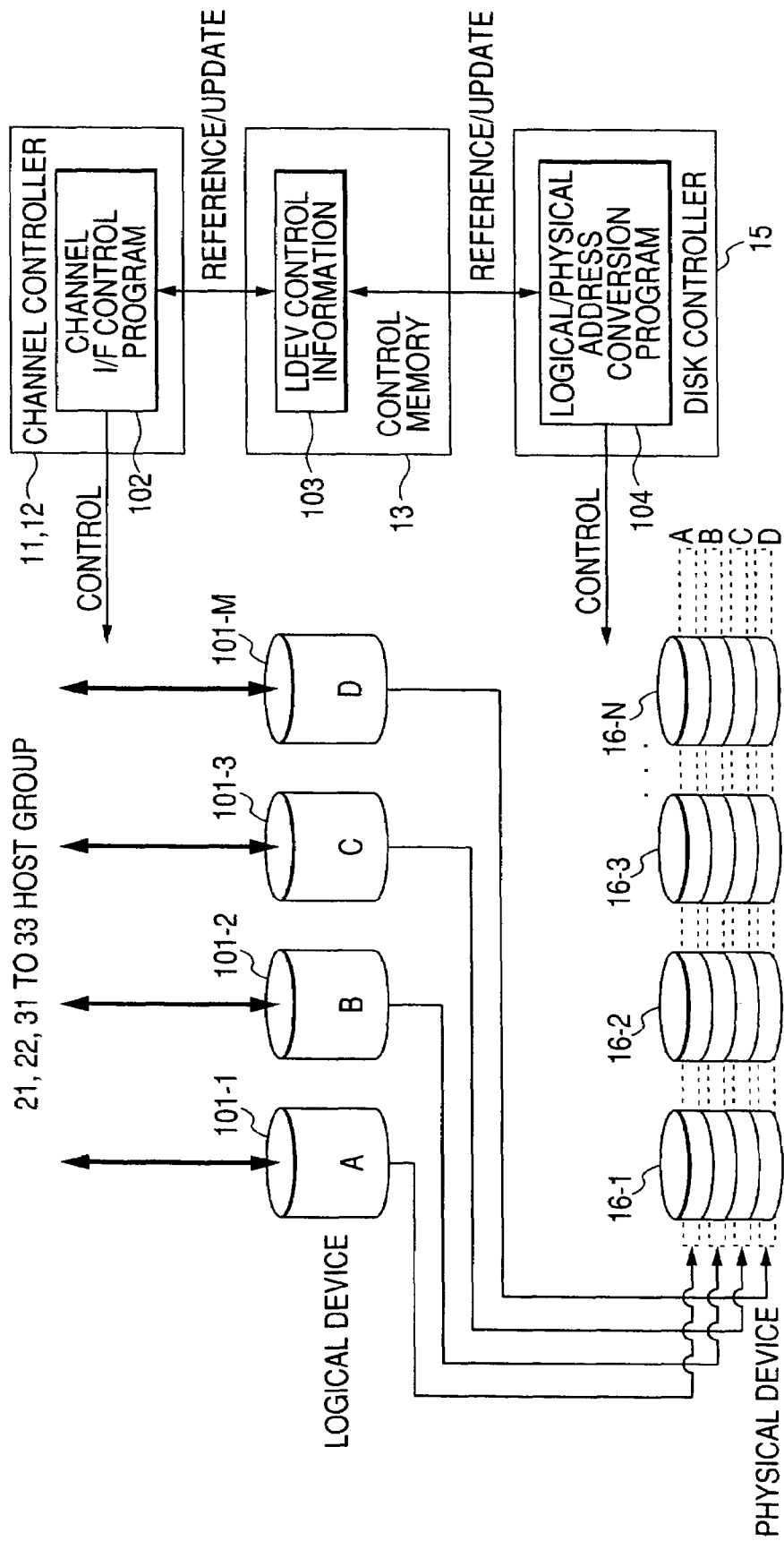
FIG. 2 is a block diagram showing the usual relationship between physical devices (HDD units) 16-1 through 16-N and logical devices in a HDD subsystem 10.

FIG. 2 shows the usual relationship between the physical devices (HDD units) 16-1 through 16-N and the logical devices in the HDD subsystem 10.

As shown in FIG. 2, in general, the plurality of the logical devices 101-1 to 101-M are respectively produced by using partial storage regions of the plurality of the physical devices (PDEV) 16-1 to 16-N. In the control memory 13, logical device (LDEV) control information 103 which is a group of various information for LDEV control of access attribute modes and others of the logical devices (LDEV) 101-1 to 101-M is stored. A channel interface (channel I/F) control program 102 installed on the channel controller 11 and 12 calculates the addresses (LDEV addresses) of logical devices (LDEVs) which are the object of access, the addresses being calculated from information for LDEV access given from a host, and refers to the LDEV control information 103 in the control memory 13 to determine the content of operation associated with the object of the access. A logical/physical address conversion program 104 installed on the disk controller 15 performs address conversion between the LDEV addresses and the PDEV addresses (the addresses of the physical devices) by calculation to determine the LDEV and PDEV addresses of the object of the access, and determine the content of the operation associated with the object of the access with reference to the LDEV control information 103 of the control memory 13.

FIG. 3 explains types of access attribute modes which are set for the respective logical devices in the HDD subsystem 10. For each logical device, six types of access attribute modes shown in (1) to (6) below can be set.

(1) Readable/Writable

Figure 3A:
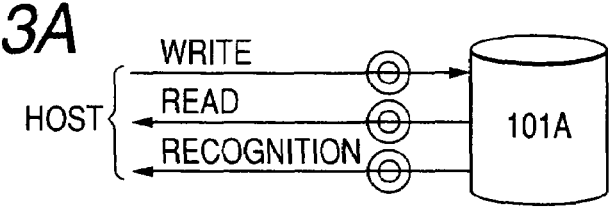
FIG. 3 is a diagram explaining types of access attribute modes which are set for the respective logical devices in the HDD subsystem 10.

As shown in of FIG. 3A, hosts can both read and write data, from/to a logical device 101A for which this access attribute mode is set, and recognize the logical device 101A.

(2) Read Only

Figure 3B:
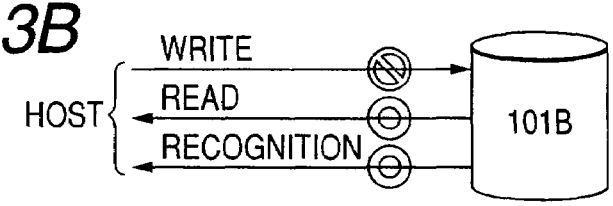

As shown in of FIG. 3B, hosts can read data from a logical device 101B for which this access attribute mode is set, and recognize the logical device 101B, but writing of data is not permitted.

(3) Unreadable/Unwritable

Figure 3C:
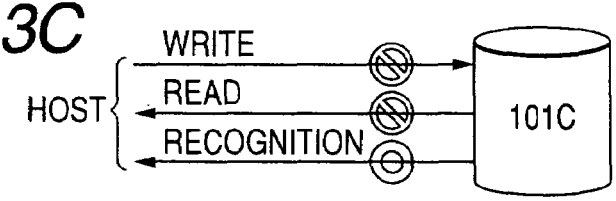

As shown in of FIG. 3C, hosts are not permitted to read or write data from/to a logical device 101C for which this access attribute mode is set, but can recognize the logical device 101C.

(4) Read Capacity 0

Figure 3D:
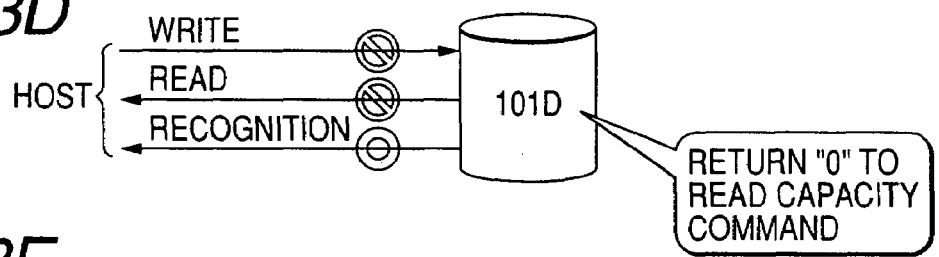

As shown in of FIG. 3D, hosts can recognize a logical device 101D for which this access attribute mode is set.

However, to a read capacity command (a command to inquire about the storage capacity of this logical device) from a host, a response saying that storage capacity '0' is returned to the host. Therefore, neither reading nor writing of data from/to this logical device 101D is permitted.

(5) Inquiry Restricted

Figure 3E:
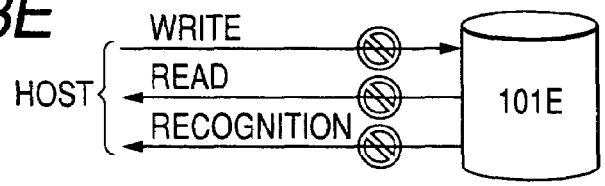

As shown in of FIG. 3E, hosts cannot recognize a logical device 101E for which this access attribute mode is set. That is, to an inquiry from a host for recognition of the logical device, a response saying that this logical device 101E does not exist is returned to the host. Therefore, access from a host is permitted for none of reading/writing of data from/to this logical device 101E, read capacity, and the like. However, in a copy pair forming operation performed as an internal function, the HDD subsystem 10 can designate this logical device 101E as the secondary volume (S-vol designation) for another logical device.

(6) Secondary Volume Disable (S-vol Disable)

Figure 3F:
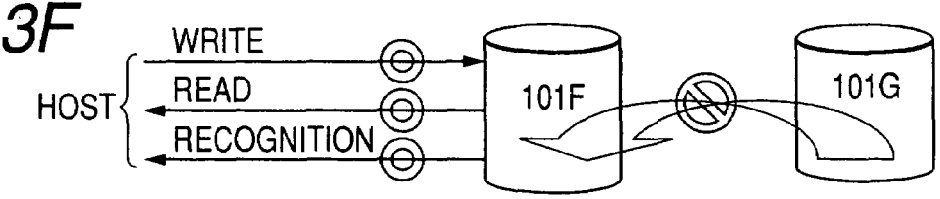

As shown in of FIG. 3F, operation to designate a logical device 101F for which this access attribute mode is set, as a secondary volume for another logical device 101G (the destination of copying data of another logical device 101G), for duplication of the logical device 101G is not permitted. In other words, it is not permitted to designate the logical device 101F as a secondary volume in a copy pair forming operation (S-vol designation). However, reading/writing data and recognition are permitted for this logical device 101F.

FIG. 4 more specifically shows the contents of access control which the HDD subsystem 10 stores for logical devices for which the above 6 types of access attribute modes are respectively set. In FIG. 4, a circle symbol indicates that access control enabling a corresponding operation is performed, and an x symbol indicates that access operation disenabling a corresponding operation is performed. The words "actual capacity" and "0" indicate that the content of a response to a Read Capacity Command from a host, the response being to be returned to the host, is the actual capacity of the logical device and capacity "0" respectively. Out of the 6 types of the access attribute modes, Readable/Writable, Read Only, Unreadable/Unwritable, and S-vol Disable can be applied to logical devices which any of M/F hosts and open hosts use. On the other hand, although, in the present embodiment, Read Capacity 0 and Inquiry Restricted can be applied only to logical devices which open hosts use, but cannot be applied to logical devices which M/F hosts use, there can be other cases.

Regarding the 6 types of the access attribute modes, one mode selected from Readable/Writable, Read Only, Unreadable/Unwritable, Read Capacity 0, and Inquiry Restricted can be set for a single logical device. On the other hand, S-vol Disable can be set for the same logical device independently from the other 5 types of access attribute modes (that is, in duplicate with them). For example, both Readable/Writable and S-vol Disable can be set for the same logical device.

Figure 5:
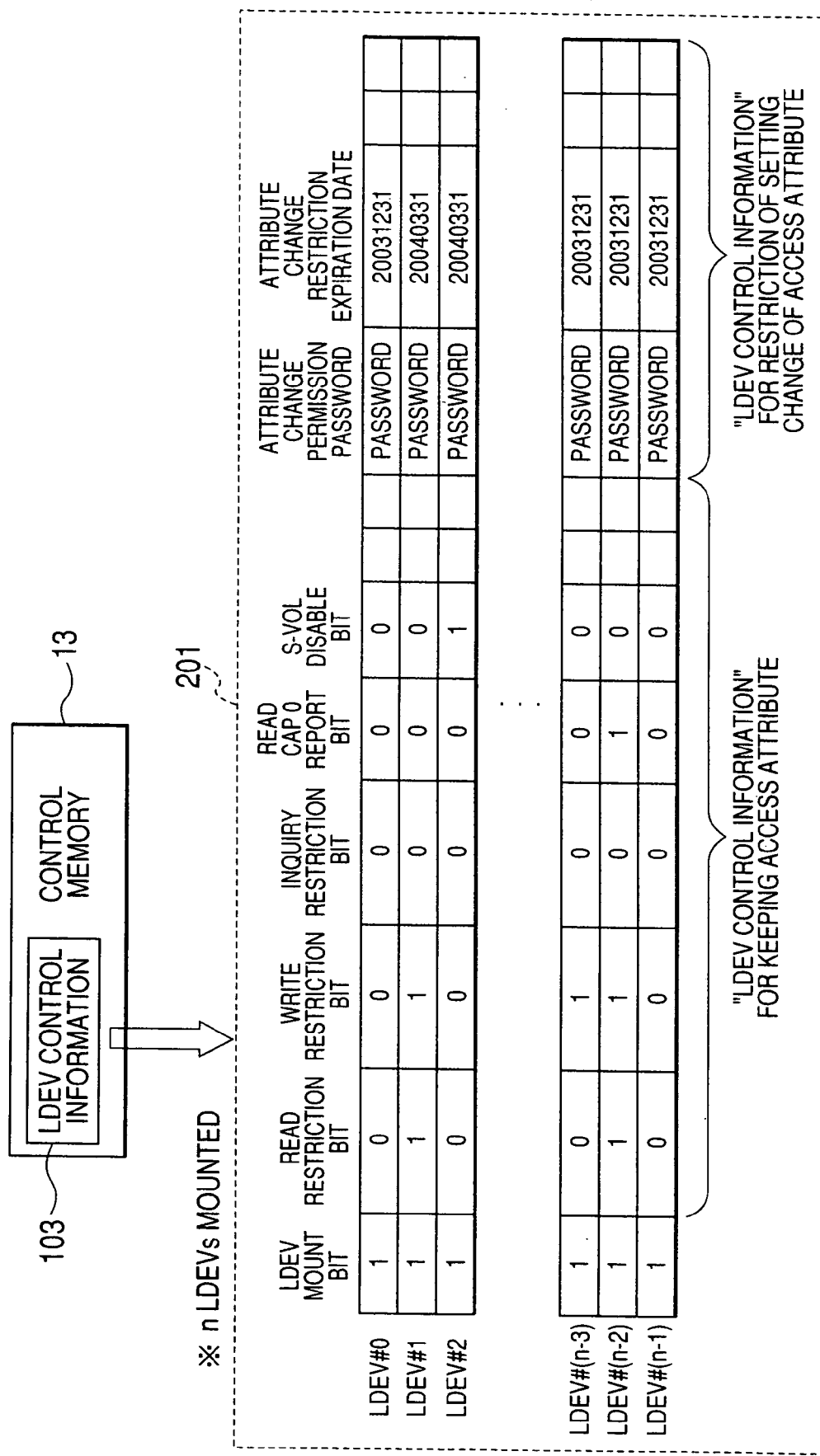
FIG. 5 is a diagram showing an example of an access attribute control table 201 to keep the settings of the access attribute modes for the respective logical devices.

FIG. 5 shows an example of an access attribute control table 201 to keep the settings of the access attribute modes for the respective logical devices (LDEVs).

As shown in FIG. 5, the access attribute control table 201 is included in the LDEV control information 103 stored in the control memory 13. The access attribute control table 201 functions as a keeping device of access attribute modes which are set for respective logical devices, and also as a device to restrict setting changes of access attribute modes by an unauthorized body. The access attribute control table 201 is secured to include the following access attribute control information for all the respective mounted logical devices.

The access attribute control table 201 has LDEV mounting bits as information to indicate whether corresponding logical devices (LDEVs) are virtually mounted for the respective identification numbers (LDEV numbers: LDEV#0, LDEV#1, ..., LDEV#(n−1), etc. in the shown example) of the logical devices (LDEVs). If a LDEV mounting bit is "1", it means that the logical device (LDEV) is virtually mounted.

Further, as information (access attribute mode information) to keep access attribute modes which are set for the logical devices (LDEVs) corresponding to the respective LDEV numbers, the access attribute control table 201 has Read Restriction bits, Write Restriction bits, Inquiry Restriction bits, Read Capacity 0 Report bits, and S-vol Disable bits. A Read Restriction bit indicates that reading data from a corresponding logical device is not permitted if it is "1", and that reading data is permitted if it is "0". A Write Restriction bit indicates that writing data to a corresponding logical device is not permitted if it is "1", and that writing data is permitted if it is "0". An Inquiry Restriction bit indicates that recognition of a corresponding logical device is not permitted if it is "1", and that recognition is permitted if it is "0". A Read Capacity 0 Report bit indicates that the fact that the capacity is zero is reported in response to a Read Capacity Command on a corresponding logical device if it is "1", and that the fact that an actual capacity is reported if it is "0". An S-vol Disable bit indicates that S-vol designation for a corresponding logical device is not permitted if it is "1", and that S-vol designation is permitted if it is "0".

Further the access attribute control table 201 includes attribute change permission passwords and attribute change restriction expiration date (year, month, date, hour, minute, and second) as information to restrict setting change of access attribute modes of the logical devices (LDEVs) corresponding to the respective LDEV numbers. An attribute change permission password is a password which is set in advance for each LDEV number to authenticate a person who has the right to carry out setting change of the access attribute mode of a corresponding device. An attribute change restriction expiration date means that setting changing of the access attribute modes of a corresponding is not permitted until this expiration comes, and this expiration date was simultaneously set when the current access attribute modes were set.

FIG. 6 shows corresponding relationships between the 6 types of access attribute modes shown in FIGS. 3 and 4, and the bit patterns of the access attribute mode information (Read Restriction bits, Write Restriction bits, Inquiry Restriction bits, Read Capacity 0 Report bits, and S-vol Disable bits) shown in FIG. 5.

In the access attribute control table 201 shown in FIG. 5, access attribute mode information is set with the bit patterns shown in FIG. 6, and thus the 6 types of access attribute modes described above are respectively set (or mode setting thereof are cancelled).

Figure 7:
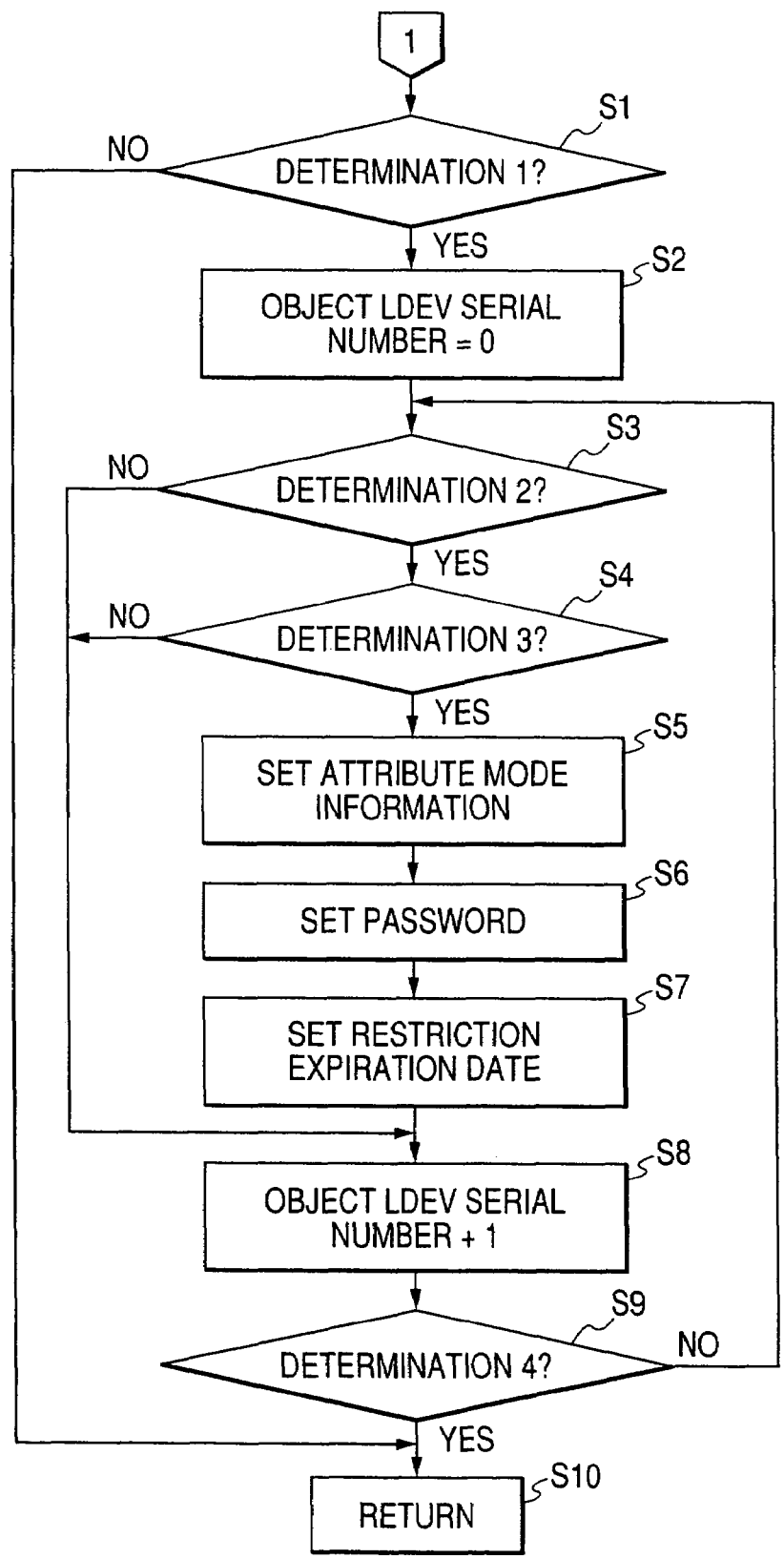
FIG. 7 is a flowchart showing the flow of a process performed on the HDD subsystem 10 when manipulations such as setting, changing, and canceling of access attribute modes are performed.

FIG. 7 shows the flow of a process performed on the HDD subsystem 10 when manipulations such as setting, changing, and canceling of access attribute modes are performed.

Instruction of manipulation (setting, changing, canceling) of access attribute modes to the HDD subsystem 10 can be performed from the consol terminals 51 and 52 shown in FIG. 1 through the console software program 71 of the service processor 41 and through an internal LAN for operation control (instruction from out-of-band), or can be performed from the storage management software programs 81, 82, and 91 to 93 of the hosts 21, 22, and 31 to 33 and through a data band (instruction from in-band). The process shown in FIG. 7 is performed by the channel controllers 11 and 12 when the instruction is received from in-band, and performed by the channel controllers 11, 12 and the disk controller 15 when the instruction is received from out-of-band.

An instruction of manipulation of an access attribute mode which is input to the HDD subsystem 10 from the service processor 41 (the console terminal 51 or 52) or an outer unit such as the host 21, 22, or 31 to 33 includes the following information (1) and (2):

(1) the quantity of logical devices which are the object of manipulation (manipulation object LDEVs quantity), and (2) the following items (i) to (iv) for each logical device being a manipulation object:
  (i) identification numbers of the logical devices which are the object of manipulation (manipulation object LDEVs numbers),
  (ii) access attribute mode information to be manipulated (Read Restriction bit, Write Restriction bit, Inquiry Restriction bit, Read Capacity 0 Report bit, or S-vol Disable bit),
  (iii) attribute change permission password, and
  (iv) attribute change restriction expiration date, wherein the relationship between the access attribute mode information to be manipulated and the access attribute modes to be set is as shown in FIG. 6. In the case of manipulation of a logical device on which an access attribute mode is already set, if the attribute change permission password does not correspond with a password which is already set, the manipulation results in error.

When the above described manipulation instruction is input from an outer unit, the process shown in FIG. 7 is performed in the HDD subsystem 10, which will be explained in sequence as below.

(1) Step S1: Determination 1: Check whether the Entire Attribute has Changed Due to the Manipulation.

In this step, conditions such as:
  (i) whether the manipulation object LDEV quantity is within a specified number,
  (ii) in the case that a logical device being the object of manipulation object can be manipulated by a plurality of controllers and exclusive control is necessary, whether the lock of the logical device is obtained, and
  (iii) in the case that attribute change requires obtaining a license, whether the host which issued an instruction (software on the host) has the license of attribute setting are checked. As a result of checking, if there is a problem, an error is determined, and, if there are no problems, the control goes to step S2.

(2) Step S2: Initial Setting of Object LDEV Serial Number

In this step, an initial value "0" is set on the serial number (object LDEV serial number) of the logical devices of manipulation object, and control goes to step S3.

(3) Step S3: Determination 2: Check of a Single Object LDEV.

In this step, conditions of each logical device of manipulation object such as:
  (i) whether the manipulation object LDEV number is proper,
  (ii) whether the bit pattern of access attribute mode information after manipulation is proper (For example, for logical devices which open hosts use, determine whether bit patterns corresponding to any of the attribute modes (1) to (7) shown in FIG. 6 are proper, and for logical devices which M/F hosts use, determine whether bit patterns corresponding to any of the attribute modes (1) to (3) and (6) to (7) shown in FIG. 6 are proper.),
  (iii) whether the logical device is mounted and normal,
  (iv) whether the attribute of the logical device can be manipulated (For example, due to the relationship with another function or operation which the HDD subsystem 10 performs, there can be a case that attribute manipulation is not permitted.)

are checked. As a result of checking, if there is a problem, an error is determined and control goes to step S8, and, if there are no problems, control goes to step S4.

(4) Step S4: Determination 3: Check Whether Attribute Setting Restriction.

In this step, conditions of each logical device of manipulation object such as:
  (i) in the case that an attribute change permission password is already registered, whether it accords with the attribute change permission password which has been input, and
  (ii) in the case that an attribute change restriction expiration date is already registered, whether the expiration date is over are checked. As a result of checking, if there is a problem, control goes to step S8, and, if there are no problems, control goes to steps S5 through S7.

(5) Steps S5 to S7: Registration of Setting in the Access Attribute Control Table 201.

In these steps, in the access attribute control table 201 shown in FIG. 5, access attribute mode information (Read Restriction bit, Write Restriction bit, Inquiry Restriction bit, Read Capacity 0 Report bit, and S-vol Disable bit), an attribute change permission password, and an attribute change restriction expiration date, on the logical device of manipulation object are registered by setting according to the manipulation instruction which has been input. However, setting registration of an attribute change permission password is performed only when an attribute change permission password is not yet registered and an attribute change permission password is included in input manipulation instruction. Also, setting registration of an attribute change restriction expiration date is performed only when an attribute change restriction expiration date is included in the manipulation instruction which has been input. Thereafter, control goes to step S8.

(6) Step S8: Increment of Serial Numbers of Manipulation Object LDEVS.

The serial number of each object LDEV is given an increment of one, and control goes to step S9.

(7) Step S9: Determination 4: Termination Determination

In this step, it is checked whether the serial number of the object LDEV has reached the manipulation object LDEV quantity. As a result, if not reached, control goes to step S3 and manipulation of an access attribute mode on the logical device of the next manipulation object is performed, and if reached, manipulation of the access attribute modes is terminated. If there occurs an error in manipulation of an access attribute mode on any of the logical devices of manipulation object, a response to be returned to an outer unit (a service processor (console terminal) or a host) includes information on the cause of an error of attribute mode manipulation on each logical device where an error has occurred.

Figure 8:
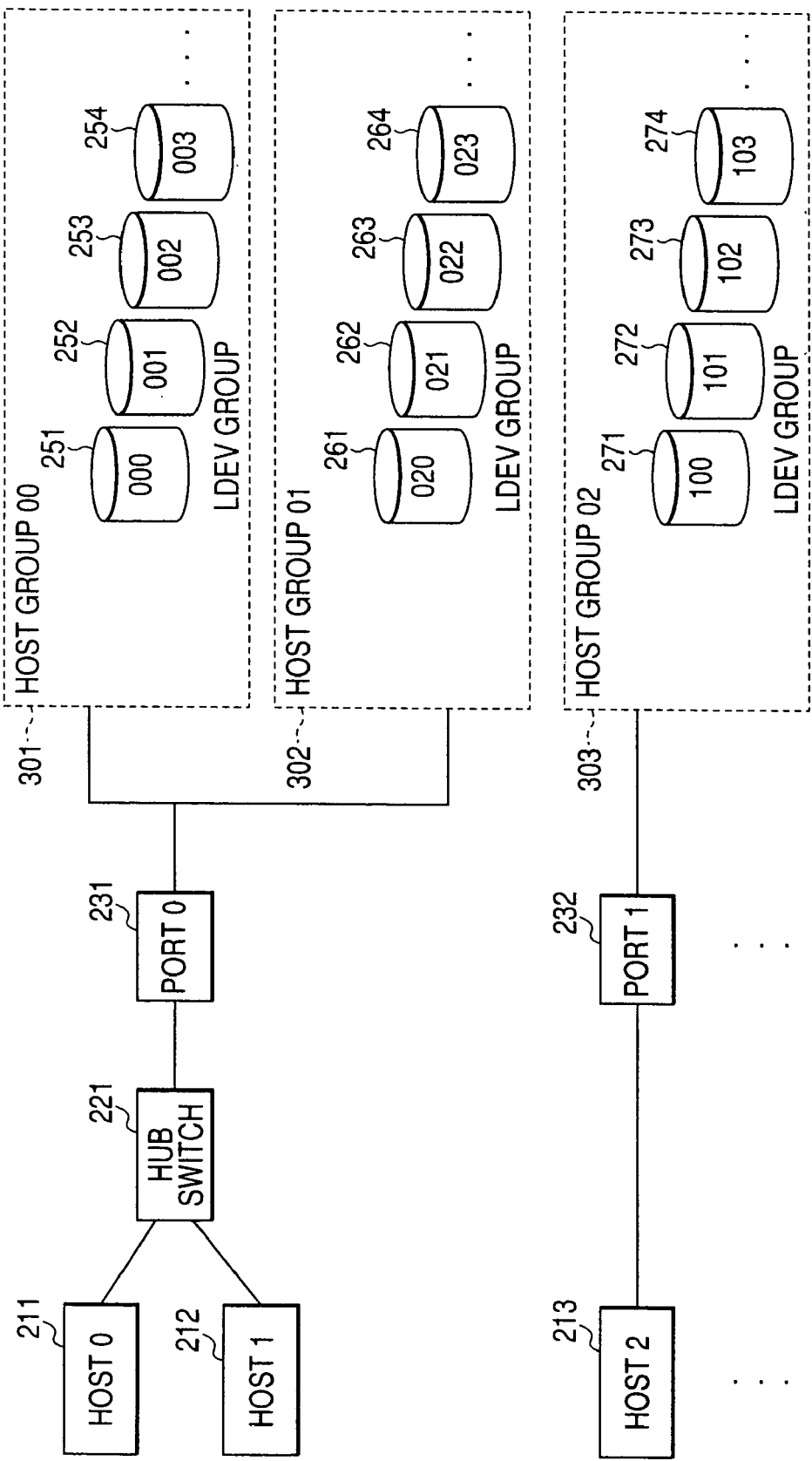
FIG. 8 is a block diagram explaining host groups.
Figure 9:
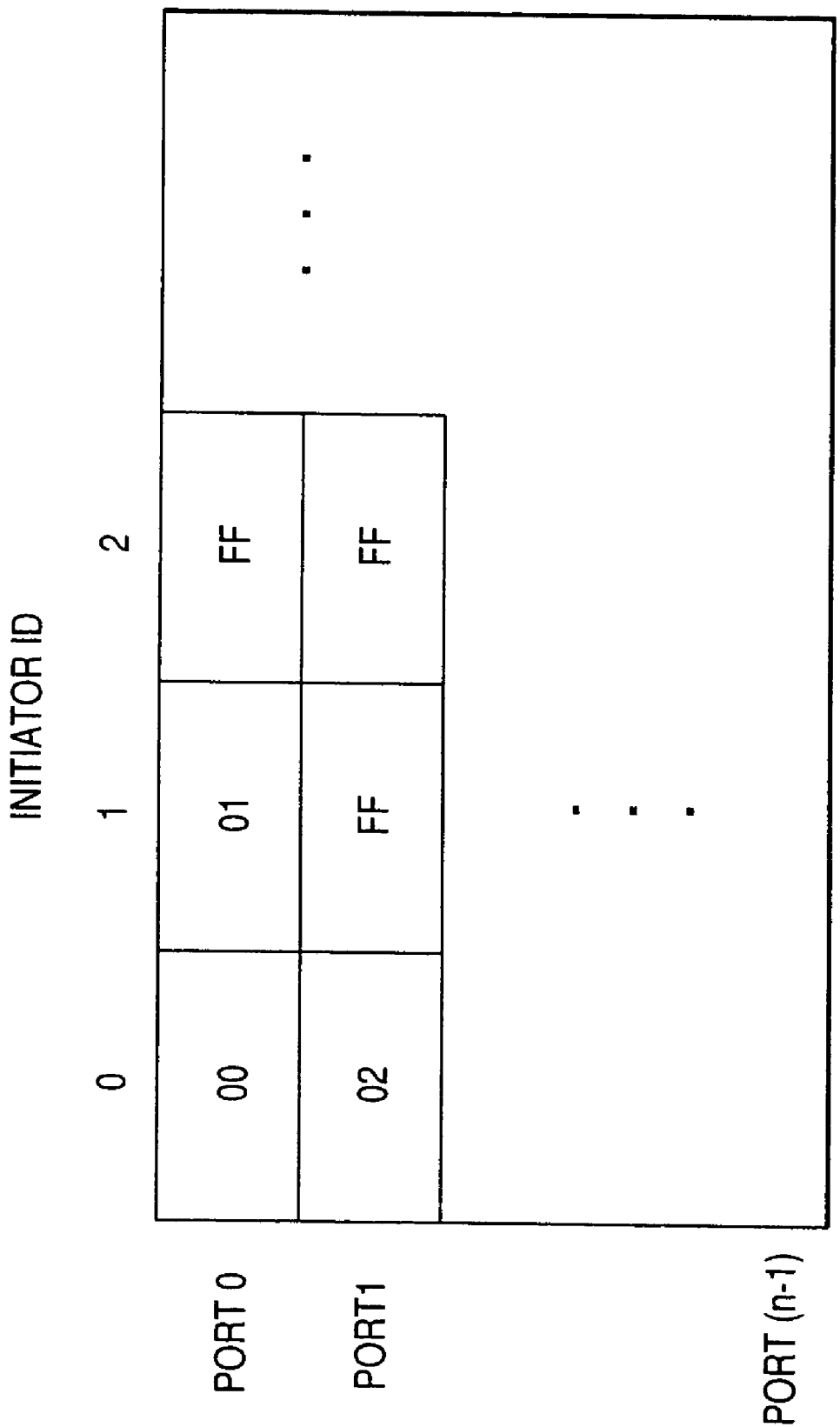
FIG. 9 is a diagram showing an example of a host group number calculation table.

FIGS. 8 to 10 explain a method of changing operations or responses in the HDD subsystem 10 to commands from hosts, depending on the vendor, the operation system, the version, or the like, of the hosts. Although this method is particularly applied for open hosts which can have different vendors, operation systems, versions, or the like, it also may be applied for all hosts including not only open hosts, but also M/F hosts.

FIGS. 8 to 10 also explain about "host group" and "host mode".

As shown in FIG. 8, for each of the plurality of channel ports 231 and 232 of the host interfaces which the channel controllers (particularly the open channel controller 12 shown in FIG. 1) of the HDD subsystem 10 have, one or a plurality of host groups 301 to 303 can be defined. Under the respective host groups 301 to 303, one or a plurality of logical devices 251 to 254, 261 to 264, and 271 to 274 can be defined. The identification numbers (host group numbers) of the host groups 301 to 303 can be calculated from port numbers and initiator IDs (the identification numbers of the hosts) in host commands. For example, a host group number calculation table, as shown in FIG. 9 as an example, is stored in advance in the HDD subsystem 10 (for example, in the control memory 13), and for example, the channel controllers determine the host group numbers from the port numbers and the initiator Ids, according to this host group number calculation table. In the example shown in FIGS. 8 and 9, the host group number corresponding port number "0" and initiator ID "0", for example, is "00", and under the host group 301 of this number "00", logical devices 251 to 254 are allocated. In other words, the host 211 of number "0" shown in FIG. 8 belongs to the host group 301 of number "00", and is allocated with the logical devices 251 to 254. Likewise, the host 212 of number "1" belongs to the host group 302 of number "01", and is allocated with the logical devices 261 to 264, and the host 213 of number "2" belongs to the host group 303 of number "02", and is allocated with the logical devices 271 to 274.

Information which is set on each host group includes "host mode". A host mode is the type of a host and is corresponding to the vendor, the operation system, the version, and the like, of the host, wherein operations or responses of the HDD subsystem 10 to commands from the host change with the host mode which the host has. A host mode is set as described below, for example. That is, a host group information table, as shown in FIG. 10 for example, to register setting information for each host group is stored in the HDD subsystem 10 (for example, in the control memory 13), and by channel controllers for example, the host modes of the respective host groups are set and registered in the host group information table. In the example shown in FIG. 10, a host mode of number "03" is set for the host group of number "00", a host mode of number "07" is set for the host group of number "01", and a host mode of number "04" is set for the host group of number "02". In such a manner, host mode numbers are different depending on host groups, and thus operations or responses of the HDD subsystem 10 to commands from hosts change with the host groups to which the respective hosts belong.

Other information which is set and registered in the host group information table shown in FIG. 10 as an example includes, for example, host group numbers, the identification numbers of allocated logical devices, and the like.

Figure 11:
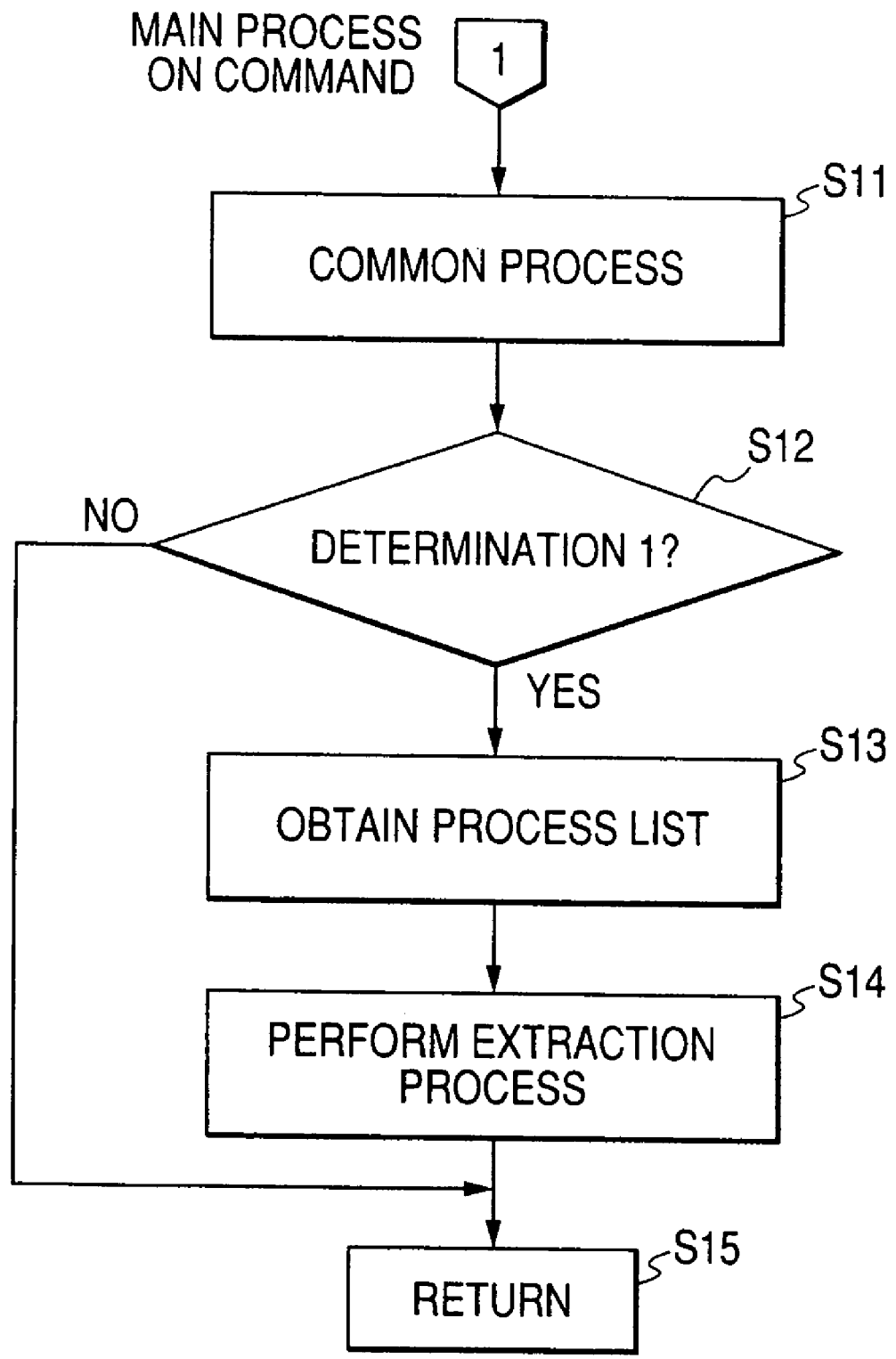
FIG. 11 is a flowchart showing the flow of the main process of a command which is input by a host, wherein the main process is performed by a channel controller of the HDD subsystem 10.

FIG. 11 shows the flow of a main process of a command from a host, wherein the main process is performed by a channel controller of the HDD subsystem 10.

Upon receipt of a command from a host, a channel controller performs a process corresponding to a command classification in the flow shown in FIG. 11, and respond to the host. The process will be explained below in sequence.

(1) Step S11: Common Process

In this step, a common process independent from command classification is performed. This common process includes calculation of the identification number (LDEV number) of the logical device of access object from an initiator ID, a target ID, an LUN number (logical unit), and the like which are included in the command from the host, obtaining the control information of configuration, using status, failure status, access attribute mode information, and the like of the logical device of access object, from the LDEV control information 103 in the control memory 13.

(2) Step S12: Determination 1

In this step, according to the control information obtained from the LDEV control information 103 in the control memory 13, conditions of the logical device of access object such as (i) whether this logical device is mounted and normal
(ii) whether this logical device is not in use
(iii) whether there is no failure report on this logical device
(iv) whether the command code (command classification) of the command from the host does not request access operation which is not permitted by the access attribute mode information of this logical device are checked. As a result of checking, if there is a problem, processing of the command is rejected, and, if there are no problems, control goes to step S13.

(3) Step S13: Obtaining a Process List

In this step, a command process list (for example, stored in the control memory 13 in advance) which lists processes to be performed for respective command codes (command classification), as shown in FIG. 12 as an example, is referenced. From this command process list, processes corresponding to the command code (command classification) of the command from the host are extracted. According to the example shown in FIG. 12, if the command code is "00" for example, process A, process C, and process E are extracted. Then, control goes to step S14.

(4) Step S14: Performing Extracted Processes

In this step, processes extracted from the command process list are respectively performed. For example, if the command code is "00", "process A", "process C", and "process E" are respectively performed, wherein branching by the host mode is carried out, if necessary. In the case the host interface is according to SCSI protocol standard, a command which carries out branching by the host mode is mostly of a control/sense/diag system. In security functions also, it is possible to perform attribute recognition of the host by changing responses to commands of a control/sense/diag system.

A more detailed flow of this step S14 will be explained later with reference to FIG. 13. After step S14, control goes to step S15.

(5) Step S15: Return

A result of processing the command is returned to the host.

Figure 13:
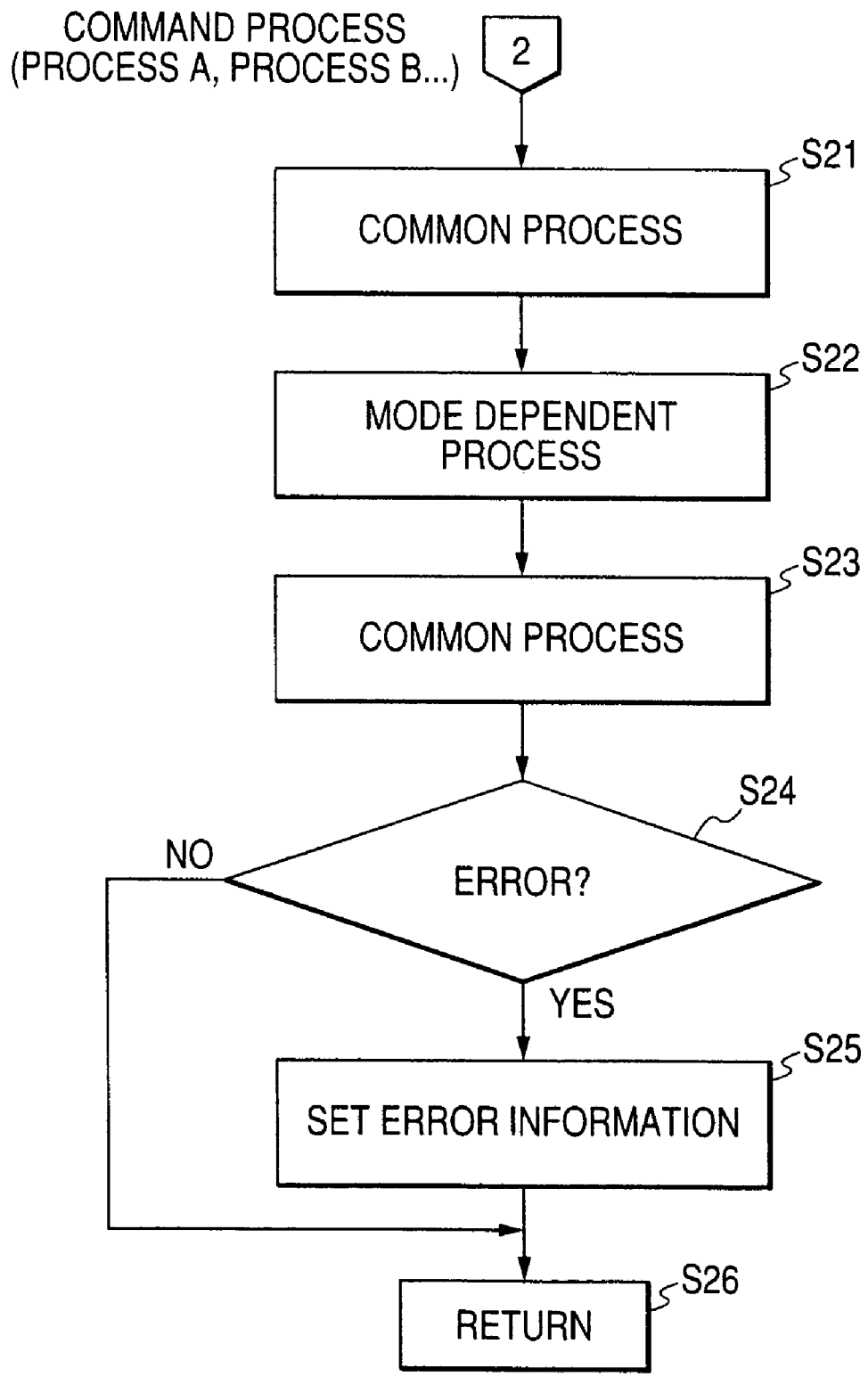
FIG. 13 is a flowchart showing a more detailed flow in performing each process in step S14 (performing extracted processes) in the main process in FIG. 11.

FIG. 13 shows a more detailed flow in executing each process (for example, in the case the command code is "00", each of "process A", "process C", and "process E") in step S14 (execution of extracted processes) in the above described main process shown in FIG. 11. The flow will be explained below in sequence.

(1) Step S21: Common Process

A process to be performed (for example, the above described "process A") is divided into a plurality of sub-processes which configure the process. In these sub-processes, if there is a sub-process which is independent from host modes (that is, a common process which is common to all host modes) and to be performed before a sub-process which is host mode dependent (that is, a sub-process which changes with host modes), the former sub-process is performed in this step S21. Thereafter, control goes to step S22.

(2) Step S22: Mode Dependent Process

In the plurality of the above described sub-processes, if there is a sub-process which is host mode dependent (mode dependent process), it is performed in this step. As a specific method, first, the table shown in FIGS. 9 and 10 as an example is referenced, according to the initiator ID of the command, the port number, the LDEV number of access object, and the like, and the host mode of the host which issued the command is determined. Then, a mode dependent process list (for example, stored in the control memory 13 in advance), as shown in FIG. 14 as an example, which lists sub-processes for respective host modes corresponding to mode dependent processes is referenced, and from the mode dependent process list, a sub-process corresponding to the mode dependent process corresponding to the host mode of the host is extracted. For example, in the case that the mode dependent process is "sub-process 1", and the host mode is number "02", "sub process b" is extracted. Then, the extracted sub process corresponding to the host modes is performed.

In the case that there is a plurality of host dependent processes, sub-processes corresponding to the host mode are selected by the above described method, for the plurality of host dependent processes, and the selected sub-processes are respectively performed.

Thereafter, control goes to step S23.

(3) Step S23: Common Process

In the plurality of sub-processes, if there is a sub-process which is a common process independent from the host mode and to be performed after mode dependent processes, the common sub-process is preformed in this step. Thereafter, control goes to step S24.

(4) Step S24 and S25: Error Response

When the performance of steps S21 to S23 normally terminates, a response indicating this fact is returned to the host. On the other hand, when an error occurs in steps S21 to S23, in the case that the error depends on the host mode (that is, a mode dependent error, on which response content (error information) needs to be changed depending on the host mode), error information corresponding to the host mode is produced and returned to the host. As an example of a specific method, a mode dependent error list (for example, stored in the control memory 13) which lists error information of the respective host modes corresponding to error codes (error classification) of mode dependent errors is referenced, and from the mode dependent error list, error information corresponding to the mode dependent error corresponding to the host mode of the host is extracted so that the extracted error information is set for the response content to the host to be returned to the host. For example, in the case that the mode dependent error is "error 1" and the host mode is number "01", error information "05" is extracted and set for the response content to be returned to the host.

Figure 16:
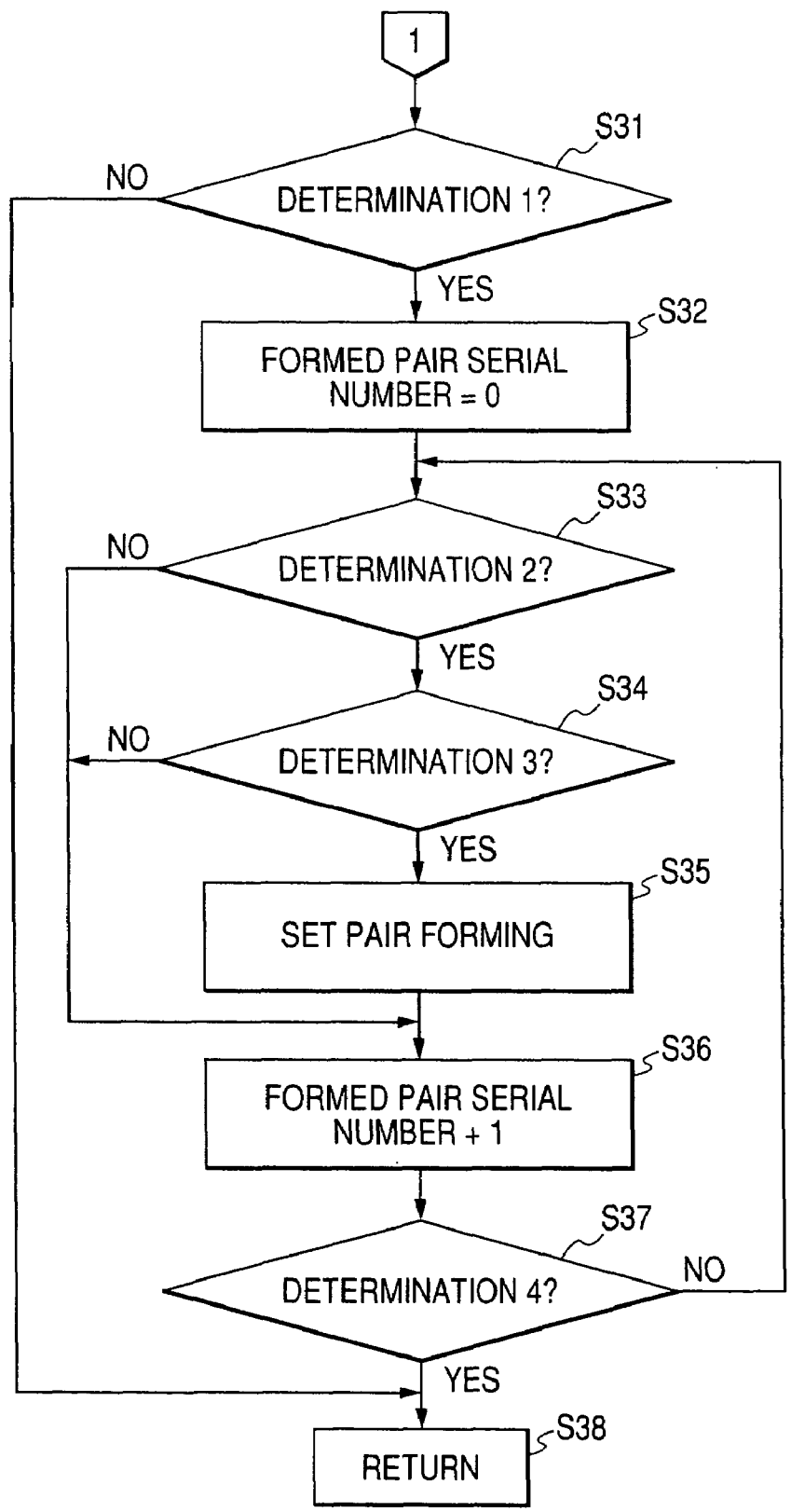
FIG. 16 is a flowchart showing the flow of a process in performing a copy pair forming operation for duplicating a logical device in the HDD subsystem 10.

FIG. 16 shows the flow of a process in performing a copy pair forming operation for duplicating a logical device in the HDD subsystem 10.

Instruction to the HDD subsystem 10 to form a copy pair can be issued from the console terminal 51 or 52 shown in FIG. 1 through the consol software program 71 of the service processor 41 and through an internal LAN for operation control (instruction from out-of-band), and also can be issued from the storage management software programs 81, 82, or 91 to 93 of the host 21, 22, or 31 to 33 through data band (instruction from in-band). The process shown in FIG. 16 is performed by the channel controller 11 and 12 when the instruction is received from in-band, and performed by the channel controller 11, 12, and the disk controller 15 when the instruction is received from out-of-band.

Instruction to form copy pairs, the instruction being input from the service processor 41 (the console terminal 51 or 52) or the outer unit of the host 21, 22, or 31 to 33 to the HDD subsystem 10, includes the following information (1) and (2).

(1) the quantity of copy pairs being formed (2) the following items (i) and (ii) for each copy pair
  (i) LDEV number of a logical device to be P-vol (primary volume: from which copying is carried out)
  (ii) LDEV number of a logical device to be S-vol (secondary volume: to which copying is carried out)

When the above operation instruction is input from an outer unit, the process shown in FIG. 16 is performed in the HDD subsystem 10. The process will be explained below in sequence.

(1) Step S31: Determination 1: Checking of the Entire Pair Forming Operation In this step, conditions such as:
  (i) whether the quantity of copy pairs to be formed is within a specified number;
  (ii) in the case that copy pair forming operation is possible from a plurality of controllers and exclusive control is necessary, whether a lock is obtained for each copy pair of formed;
  (iii) in the case that copy pair forming operation requires obtaining a license, whether there is a license for copy pair forming operation on the host (software on the host) which issued the instruction are checked. As a result of checking, if there is a problem, an error is determined, and, if there are no problems, control goes to step S32.

(2) Step S32: Initial Value Setting of the Serial Numbers of Copy Pairs to be Formed In this step, an initial value "0" is set on the serial numbers (formed pair serial number) of copy pairs to be formed, and control goes to step S33.

(3) Step S33: Determination 2: Checking of P-vol

In this step, for each logical device which is the object of manipulation for P-vol, conditions such as
  (i) whether LDEV number of the logical device is proper
  (ii) whether the logical device is mounted and normal
  (iii) whether the logical device may be made P-vol (for example, there can be a case that manipulation of making the logical device P-vol is not permitted due to the relationship with other functions or operations which the HDD subsystem 10 performs)

are checked. As a result of checking, if there is a problem, an error is determined and control goes to step S36, and, if there are no problems, control goes to step S34.

(4) Step S34: Determination 3: Checking of S-vol

In this step, for each logical device which is the object of manipulation for S-vol, conditions such as
  (i) whether LDEV number of the logical device is proper
  (ii) whether the logical device is mounted and normal
  (iii) whether the logical device may be made S-vol (particularly, if the S-vol disable bit shown in FIG. 5 is "1", it can not be made S-vol, and even if not so, there can be a case that this manipulation of making the logical device S-vol is not permitted due to the relationship with other functions or operations which the HDD subsystem 10 performs, for example)

are checked. As a result of checking, if there is a problem, an error is determined and control goes to step S36, and, if there are no problems, control goes to step S35.

(5) Step S35: Copy Pair Forming

In this step, the above described two logical devices which are the object of manipulation are respectively designated as P-vol and S-vol, and data is copied from P-vol to S-vol to form a copy pair thereof. Then, control goes to step S36.

(6) Step S36: Increment of the Forming Copy Pair Serial Number

Forming copy pair serial numbers are given an increment of one, and control goes to step S37.

(7) Step S37: Determination 4: Determination of Termination

In this step, it is checked whether the forming copy pair serial number has reached the quantity of copy pairs to be formed. As a result of checking, if not reached, control goes to step S33 and a similar process is performed for the next copy pair of forming object, and if reached, copy pair forming manipulation is terminated. In the case that an error has occurred in copy pair forming manipulation on any copy pairs to be formed, in each response to be returned to the outer unit (a service processor (console terminal) or a host), information on the error factor of each copy pair on which the error has occurred is included.

The configuration and functions of an HDD subsystem 10 according to the present embodiment has been described above. In the following, a method and an example of using security functions which the HDD subsystem 10 has, and an example of application utilizing the security functions (control functions of access attributes) of the HDD subsystem 10 will be described.

First, the method of using the security functions will be described. Regarding the aforementioned 6 types of access attribute modes, to make a host use a logical device after setting either Regarding Read Only or Unreadable/Unwritable, the following operations
  (1) the access attribute mode is set for the logical device of object, (2) then, the host makes connection (mount) with the logical device,
  (3) and then, the host starts using the logical device are performed in sequence. On the other hand, the access attribute modes other than the above, that is, Readable/Writable, Read Capacity 0, Inquiry Restricted, and S-vol Disable, do not require a particular procedure such as described above.

Next, an example of using the security functions will be briefly described. The 6 types of access attribute modes can be used for the following purposes, for example.

(1) Example of Using Read Only

Archiving of data (government and municipal documents, clinical charts, settlement documents, mail history, etc.), data publication at web sites, etc.

(2) Example of Using Unreadable/Unwritable temporary data unpublication (web sites, etc.), data destruction prevention on uncontrollable going of host operation, etc.

(3) Example of Using Read Capacity 0/Inquiry Restricted long term data unpublication, concealment of data existence itself, etc.

(4) Example of S-vol Disable data protection under automatic copy pair forming environment, etc.

Figure 17:
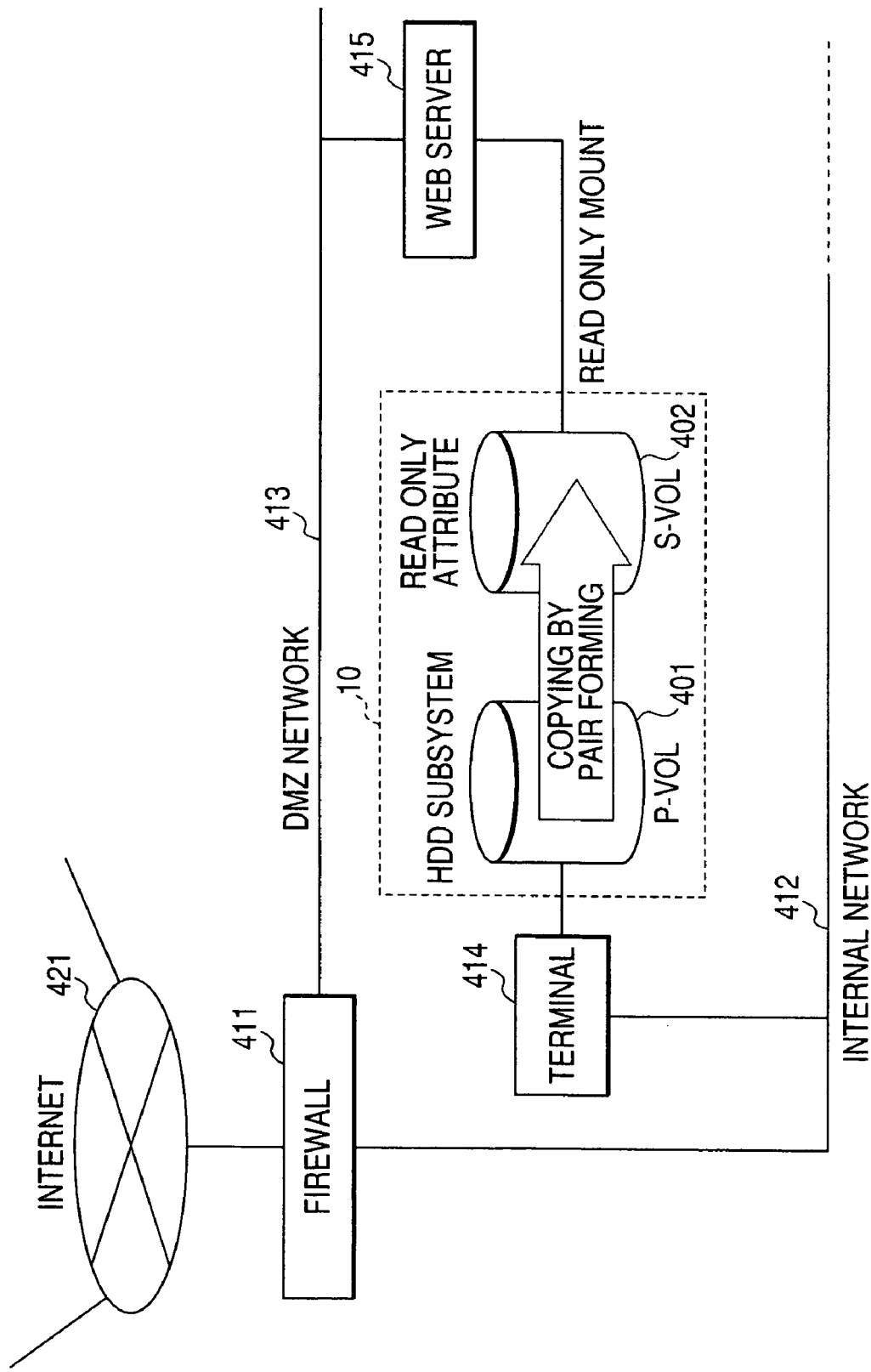
FIG. 17 is a block diagram showing a configuration of a web site system as an example of application utilizing security functions of the HDD subsystem.

Next, an example of application of utilizing the security functions of the HDD subsystem 10 will be described. FIG. 17 shows the configuration of a web site as an example of this kind of application.

This web site utilizes the security functions and the copy (duplication) function of the HDD subsystem 10. As shown in FIG. 17, inside of a firewall 413 which is connected to an outer network such as the internet 421, there is an internal network 412. Inside the firewall 413, there is also a DMZ (demilitarized) network 413 which is isolated from the internal network 412. On the internal network 412, there is a data update terminal 414 to update data of this web site. On the DMZ network 413, there is a web server 415 to publicize the data of this web site to the internet 421. The data update terminal 414 is connected to the HDD subsystem 10 as a host, and able to access a first logical device 401 in the HDD subsystem 10. This first logical device 401 is for accumulating original data of this web site. On the other hand, the web server 415 is connected to into the HDD subsystem 10 as another host, and able to access a second logical device 402 inside the HDD subsystem 10. This second logical device 402 is for accumulating copy data of the original data of this web site.

The web server 415 publicizes the data accumulated in the second logical device 402 to the internet 421 through the DMZ network 413. During the period when this data publication is executed, the second logical device 402 is in a state of being split from the first logical device 401. In the case of updating the data of this web site, the following operations (1) to (6) are performed in sequence.

(1) The web server 415 stops the publication service of data of this web site.
(2) The web server 415 performs disconnecting (unmount) to the second logical device 402.
(3) A data update terminal 414 makes a first logical device 401 P-vol, makes the second logical device 402 S-vol, to perform copy pair forming between the two, and update the original data in the first logical device 401 (P-vol). The updated original data is automatically copied to the second logical device 402 (S-vol) by the HDD subsystem 10. That is, the second logical device 402 is synchronized to the first logical device 401.
(4) After data updating is completed, the data update terminal 414 performs splitting between the first logical device 401 (P-vol) and the second logical device 402 (S-vol).
(5) A web server 415 performs connection (mount) to the second logical device 402 of Read Only again.
(6) The web server 415 resumes the publication service of the data (copy data in the second logical device 402) of this web site.

FIG. 18 explains a control method of pubilication/unpublication of archival data to the internet or the like, which is another example of application of the HDD subsystem 10.

In the example shown in FIG. 18, a case that the following operation policy is adopted is assumed. That is, a plurality of logical devices LDEV#0 to LDEV#3 is object of publication. In the publication period, the access attribute modes of the logical devices LDEV#0 to LDEV#3 of the object are Read Only. Different publication periods (publication termination date) can be set for the respective logical devices LDEV#0 to LDEV#3. After terminating publication, publicized data is stored for a certain period (for example, 3 months).

Specific examples of control under the above operation policy will be described below.

(1) As shown in of FIG. 18A, the logical devices LDEV#0 to LDEV#3 are mounted on May 1, for example. The initial access attribute mode of the logical devices LDEV#0 to LDEV#3 is Readable/Writable.
(2) As shown in of FIG. 18B, data is written to partial logical devices LDEV#0 to LDEV#2 on May 5, for example. Then, the access attribute mode of the logical devices LDEV#0 to LDEV#2 is changed to Read Only, and data of these logical devices is publicized. In this case, if the publication periods (publication termination date) of the logical devices LDEV#0 to LDEV#2 are different, the different publication termination dates are set as the respective attribute change restriction expiration dates. For example, for the logical device LDEV#0, if the publication period is one month, June 4, which is one month later, is set as the attribute change restriction expiration date; for the logical device LDEV#1, if the publication period is two months, July 4, which is two months later, is set as the attribute change restriction expiration date; and for the logical device LDEV#2, if the publication period is unlimited, no attribute change restriction expiration date is set.

(3) As shown in of FIG. 18C, on June 5, which is just after the publication termination date (attribute change restriction expiration date) of LDEV#0, the access attribute mode of this logical device LDEV#0 is changed to Unreadable/Unwritable, and publication of this logical device LDEV#0 is terminated. In this case, the attribute change restriction expiration date is set to the data storage expiration date which is after the publication termination. For example, if the storage period is three month, September 4, which is three months later, is set as the new attribute change restriction expiration date.

(4) As shown in of FIG. 18D, for example on June 19, data is written to the remaining logical device LDEV#3. Then, the access attribute mode of this logical device LDEV#3 is changed to Read Only, and this logical device is publicized. In this case, the publication termination date of the logical device #LDEV3 id set as a new attribute change restriction expiration date. For example, if the publication period is two months, August 18, which is two months later, is set as the new attribute change restriction expiration date.

(5) As shown in of FIG. 18E, on July 5, which is just after the publication termination date (attribute change restriction expiration date) of the logical device LDEV#1, the access attribute mode of this logical device LDEV#1 is changed to Unreadable/Unwritable, and publication of this logical device LDEV#1 is terminated. In this case, the attribute change restriction expiration date is set to the data storage expiration date which is after termination of publication. For example, if the storage period is three month, October 4, which is three months later, is set as the new attribute change restriction expiration date.

(6) As shown in of FIG. 18F, on August 19, which is just after the publication termination date (attribute change restriction expiration date) of the logical device LDEV#3, the access attribute mode of this logical device LDEV#3 is changed to Unreadable/Unwritable, and publication of this logical device LDEV#3 is terminated. In this case, the attribute change restriction expiration date is set to the data storage expiration date which is after termination of publication. For example, if the storage period is three month, November 18, which is three months later, is set as the new attribute change restriction expiration date.

(7) As shown in of FIG. 18G, on September 5, which is just after the data storage expiration date (attribute change restriction expiration date) of the logical device LDEV#0, the access attribute mode of this logical device LDEV#0 is changed to Readable/Writable, and data storage of this logical device LDEV#0 is terminated.

In the above, an embodiment of the invention has been described.

However, this embodiment is an example for explanation of the invention, and it is not to be understood that the scope of the invention is limited to this embodiment. Accordingly, within the spirit and scope of the invention, the invention can be applied in various embodiments different form the above embodiment.

In a specific view of the invention, it is possible to realize a more advanced method of access control and security control of logical devices of a storage system.

In another specific view of the invention, it is possible to make operations and responses of logical devices of a storage system to hosts, suitable for an open system.

In still another view of the invention, it is possible to automatically perform management tasks such as setting and canceling of access attribute modes of logical devices of a storage system, from applications on various hosts of an open system.

What is claimed is:

1. A storage system comprising:
a plurality of disk drives; and
a controller controlling to read/write data from/to a plurality of logical volumes formed on said disk drives,
wherein said controller controls to respond to a read capacity command from a host computer with respect to a specified volume with a volume capacity of the specified logical volume when a specified mode of access to the specified logical volume has not been set and with a "0" capacity of the specified logical volume when said specified mode of access to the specified logical volume has been set.

2. A storage system comprising:
a plurality of disk drives; and
a controller controlling to read/write data from/to a plurality of logical volumes formed on said disk drives,
wherein said controller controls to respond to a read capacity command from a host computer with respect to a specified volume with a volume capacity of the specified logical volume when a specified mode of access to the specified logical volume has not been set and with a "0" capacity of the specified logical volume when said specified mode of access to the specified logical volume has been set, and
wherein said specified mode is a read capacity "0" mode which allows an outer unit to recognize the specified logical volume but not conduct read or write operations to the specified logical volume.

3. A storage system comprising:
a plurality of disk drives; and
a controller controlling to read/write data from/to a plurality of logical volumes formed on said disk drives,
wherein said controller controls to respond to a read capacity command from a host computer with respect to a specified volume with a volume capacity of the specified logical volume when a specified mode of access to the specified logical volume has not been set and with a "0" capacity of the specified logical volume when said specified mode of access to the specified logical volume has been set, and
wherein the specified mode is set by a management computer.

4. A storage system comprising:
a plurality of disk drives; and
a controller controlling to read/write data from/to a plurality of logical volumes formed on said disk drives,
wherein said controller controls to respond to a read capacity command from a host computer with respect to a specified volume with a volume capacity of the specified logical volume when a specified mode of access to the specified logical volume has not been set and with a "0" capacity of the specified logical volume when said specified mode of access to the specified logical volume has been set, and wherein the specified mode is selected from among a plurality of device recognition control modes settable by a user.

5. A storage system comprising:
a plurality of disk drives; and
a controller controlling to read/write data from/to a plurality of logical volumes formed on said disk drives, wherein
wherein said controller controls to respond to a read capacity command from a host computer with respect to a specified volume with a volume capacity of the specified logical volume when a specified mode of access to the specified logical volume has not been set and with a "0" capacity of the specified logical volume when said specified mode of access to the specified logical volume has been set, and
wherein information of the specified mode is stored in a memory of the controller.

6. A method of controlling access to logical volumes in a storage system having a plurality of disk drives and a controller controlling to read/write data from/to said logical volumes which are formed on said disk drives, said method comprising:
controlling, by said controller, a response to a read capacity command from a host computer with respect to a specified logical volume;
if a specified mode of access to the specified logical volume has been set, then responding with a "0" capacity of the specified logical volume; and
if the specified mode of access to the specified logical volume has not been set, then responding with a volume capacity of the specified logical volume.

7. A method of controlling access to logical volumes in a storage system having a plurality of disk drives and a controller controlling to read/write data from/to said logical volumes which are formed on said disk drives, said method comprising:
controlling, by said controller, a response to a read capacity command from a host computer with respect to a specified logical volume; if a specified mode of access to the specified logical volume has been set, then responding with a "0" capacity of the specified logical volume; and
if the specified mode of access to the specified logical volume has not been set, then responding with a volume capacity of the specified logical volume,
wherein said specified mode is a read capacity "0" mode which allows an outer unit to recognize the specified logical volume but not conduct read or write operations to the specified logical volume.

8. A method of controlling access to logical volumes in a storage system having a plurality of disk drives and a controller controlling to read/write data from/to said logical volumes which are formed on said disk drives, said method comprising:
controlling, by said controller, a response to a read capacity command from a host computer with respect to a specified logical volume;
if a specified mode of access to the specified logical volume has been set, then responding with a "0" capacity of the specified logical volume; and if the specified mode of access to the specified logical volume has not been set, then responding with a volume capacity of the specified logical volume,
wherein the specified mode is set by a management computer.

9. A method of controlling access to logical volumes in a storage system having a plurality of disk drives and a controller controlling to read/write data from/to said logical volumes which are formed on said disk drives, said method comprising:
controlling, by said controller, a response to a read capacity command from a host computer with respect to a specified logical volume;
if a specified mode of access to the specified logical volume has been set, then responding with a "0" capacity of the specified logical volume; and if the specified mode of access to the specified logical volume has not been set, then responding with a volume capacity of the specified logical volume,
wherein the specified mode is selected from among a plurality of device recognition control modes settable by a user.

10. A method of controlling access to logical volumes in a storage system having a plurality of disk drives and a controller controlling to read/write data from/to said logical volumes which are formed on said disk drives, said method comprising:
controlling, by said controller, a response to a read capacity command from a host computer with respect to a specified logical volume;
if a specified mode of access to the specified logical volume has been set, then responding with a "0" capacity of the specified logical volume; and if the specified mode of access to the specified logical volume has not been set, then responding with a volume capacity of the specified logical volume,
wherein information of the specified mode is stored in a memory of the controller.

* * * * *